United States Patent [19]

Shimamura et al.

[11] 3,931,004

[45] Jan. 6, 1976

[54] METHOD OF TREATING WASTE LIQUIDS FROM PHOTOGRAPHIC PROCESSINGS

[75] Inventors: Isao Shimamura; Haruhiko Iwano, both of Minami-ashigara, Japan

[73] Assignee: Fuji Photo Film Co., Ltd., Minami-ashigara, Japan

[22] Filed: Apr. 19, 1973

[21] Appl. No.: 352,817

[30] Foreign Application Priority Data
   Apr. 21, 1972  Japan.............................. 47-40205

[52] U.S. Cl. .................... 210/32; 210/37; 423/367
[51] Int. Cl.² ......................................... B01D 15/06
[58] Field of Search ........ 96/50 R, 60 R, 60 BF, 92; 210/24, 30, 32, 37; 75/101 BE; 423/367, 377

[56] References Cited
UNITED STATES PATENTS

| 2,688,000 | 8/1954 | Kressman et al. ................ 210/30 X |
| 3,232,867 | 2/1966 | Abrams............................ 210/30 X |
| 3,253,920 | 5/1966 | Rees et al. ....................... 210/30 X |
| 3,293,036 | 12/1966 | Mekl et al........................ 96/60 BF |
| 3,429,835 | 2/1969 | Odland ............................ 210/32 X |
| 3,634,088 | 1/1972 | Cooley............................. 96/60 BF |
| 3,667,950 | 6/1972 | Amano et al. ................... 96/60 BF |

OTHER PUBLICATIONS

Chemical Abstracts: Vol. 72, 1970, 59556a; Vol. 69, 1968, 80027b; Vol. 70, 1969, 23149a; Vol. 66, 1967, 32248r.
Photographic Processing Chemistry, 1966, The Focal Library, Mason, p. 212.

Primary Examiner—Charles N. Hart
Assistant Examiner—Robert H. Spitzer
Attorney, Agent, or Firm—Sughrue, Rothwell, Mion, Zinn & Macpeak

[57] ABSTRACT

Ferricyanide ions and/or ferrocyanide ions are removed effectively from a photographic reducer or waste liquid containing them by contacting the waste liquid with a weakly basic anion exhange resin in the presence of ammonium ions and thiosulfate ions.

17 Claims, No Drawings

METHOD OF TREATING WASTE LIQUIDS FROM PHOTOGRAPHIC PROCESSINGS

BACKGROUND OF THE INVENTION

1. Field of the Invention

This invention generally relates to a method of treating waste liquids from photographic processings and more particularly it relates to a method of treating photographic waste liquids containing ferricyanide ions and/or ferrocyanide ions.

2. Description of the Prior Art

Some photographic processings containg a bleaching step. In the bleaching step metallic silver formed by development is converted into silver ions using an oxidizing agent, and such a step is included in processings for silver halide color photographic materials and reducers for photographic printing materials.

The inventors previously proposed to treat waste liquids from photographic processings containing ferricyanide ions and/or ferrocyanide ions with a weakly basic anion exchange resin for removing the ferricyanide ions and/or the ferrocyanide ions (Japanese patent application No. 92,115/1971 and Japanese Patent Application No. 22,907/1972). The methods as disclosed in the above patent applications may be superior to conventional methods in the point of removing ferricyanide ions and/or ferrocyanide ions, but if the ion-exchange resins used in these previous treatments are reused after being regenerated, the ion-exchange capacity of the ion-exchange resins gradually becomes lower and thus the removal of feriicyanide ions and/or ferrocyanide ions becomes inefficient. Accordingly, by these conventional methods the cost of waste liquid treatment becomes high.

To overcome these difficulties, a means of modifying the ion-exchange resins may be encountered, but at present, materials superior to weakly basic anion-exchange resin have not been found.

An object of this invention is, therfore, to provide an efficient and economic method of removing ferricyanide ions and/or ferrocyanide ions in waste liquids from photographic processings.

Another object of this invention is to provide an efficient and economic method of removing ferricyanide ions and/or ferrocyanide ions from a waste reducer liquid.

The inventors have discovered that the above objects of this invention can be achieved by contacting such waste liquids containing ferricyanide ions and/or ferrocyanide ions with a weakly basic ion-exchange resin in the presence of ammonium ions and thiosulfate ions.

The method of this invention will now be explained by referring to an example of treating a photographic reducer. A reducer is used for correcting or reducing the developed density of excessively exposed or excessively developed images or fringed or fogged images which are undesirable for making printing masters, or is used for controlling the gradation of dot images. As such reducers, there are known a Farmer's reducer, a combination of iodine and alkali cyanide reducer, a cerium sulfate reducer, a potassium persulfate reducer, a potassium permanganate reducer and the like. The reducing treatment is described in detail in Erwin Gaffe; "Halftone Photography For Offset Lithography", pages 140–146, published in 1960 by the Lithographic Technical Foundation Inc., New York, New York.

The most commonly used reducers contain ferricyanide and thiosulfate as is well known in the art. Other components are usually present in negligible proportions. The reducers are different from each other only in the concentration of ferricyanide and thiosulfate. Recently, such reducers have been called Farmer's reducers in the art, often comprising potassium ferricyanide and sodium thiosulfate. If a used Farmer's reducer is contacted with a weakly basic anion-exchange resin, ferri-and ferrocyanide in the reducer are adsorbed on the resin and removed from solution. The resin is then treated with an alkaline solution to recover the ferri-and ferrocyanide. However, with repeated absorptions and recoveries, the recovery efficiency of the ferricyanide ions and/or the ferrocyanide ions is gradually reduced.

SUMMARY OF THE INVENTION

It has been discovered that if ammonium thiosulfate is added to the Farmer's reducer or sodium thiosulfate in the Farmer's reducer is replaced with ammonium thiosulfate, the ion-exchange power of the weakly basic anion-exchange resin is increased and thus the recovery efficiency for ferricyanide ions and/or the ferrocyanide ions by the ion-exchange resin after regeneration is remarkably increased.

DETAILED DESCRIPTION OF THE INVENTION

The content of ammonium thiosulfate is preferably as large as possible and the amount is selected based on economic aspects. Thus, if ammonium thiosulfate is preliminarily added to the reducer before use, that is to say if ammonium thiosulfate is used as the thiosulfate in the reducer, the treatment of the waste reducer can be very effectively carried out as compared with the case of adding ammonium thiosulfate to a used reducer or waste liquid, but the present invention also includes the latter case.

Ammonium thiosulfate in the method of this invention include equivalent materials. For instance, in place of ammonium thiosulfate, sodium ammonium thiosulfate may be used and further a combination of a thiosulfate other than the ammonium salt or an ammonium compound per se, e.g., aqueous ammonia, ammonium chloride, ammonium sulfate, and ammonium acetate in combination with a thiosulfate, can be used. In short, the results of the invention can be attained in the presence of ammonium ion and thiosulfate ion. Therefore, any additive which gives these ions can be used. Of course, ammonium halides other than chloride, and salts other than the acetate can be used.

Generally speaking, in such reducers the amount of thiosulfate is at most about 20 times the amount of ferricyanide. This figure is not critical, but is the guideline most generally used in the art.

Ion-exchange resins generally marketed are clasified into the following four basic types:

1. Strongly-acid cation-exchange resins: Free acid type and salt type. (exchange group: $-SO_3M$ and $-CH_2SO_3M$, wherein M is a cation).
2. Weakly-acid cation-exchange resins: Free acid type and salt type. (exchange group: COOm, wherein M is a cation).
3. Strongly-basic anion-exchange resins: Free acid type and salt type. (exchange group: ≡NX, where X is an anion).
4. Weakly-basic anion-exchange resins: Free acid type and salt type. (exchange group: $-NH_2$, =NH, ≡N).

As the results of the inventors' attempts to conduct the ion exchange of ferricyanide ions and/or ferrocyanide ions in waste liquids by an anion-exchange resin, it was confirmed that when a strongly-basic anion-exchange resin is used for ion exchange of ferricyanide ions/and or ferrocyanide ions in a waste liquid, irreversible adsorption occurs, and thus the ion-exchange resin can not be regeneratead completely and the ion-exchange faculty of the ion-exchange resin for ferricyanide ions and/or ferrocyanide ions after regeneration greatly decreases to about 10–40% of the ion exchange faculty of fresh ion-exchange resin.

On the other hand, a weakly-basic anion-exchange resin has either a low or no ion exchange faculty for ferricyanide ions and/or ferrocyanide ions. However, as a result of investigating the ion-exchange faculty of a weakly-basic anion-exchange resin for ferricyanide ions and/or ferrocyanide ions in a waste liquid containing the same, when ammonium ions and thio sulfate ions, e.g., ammonium thiosulfate, are added to the waste solution containing the ferricyanide ions and/or the ferrocyanide ions, it was confirmed that the ion-exchange capacity of the ion-exchange resin increases greatly, the ion-exchange resin used for the ion-exchange of ferricyanide ions and/or ferrocyanide ions can be easily regenerated by a sodium hydroxide solution, and further the reduction in ion-exchange faculty of the ion-exchange resin after regeneration is quite low.

On the other hand, it was also found that when a strongly-basic anion-exchange resin was used for the ion-exchange of ferricyanide ions and/or ferrocyanide ions in the presence of ammonium thiosulfate, the ion-exchange faculty increased slightly but complete regeneration of the ion-exchange resin was impossible, the ion-exchange faculty of the ion-exchange resin after regeneration was very low and the ion-exchange faculty of the resin after regeneration was only 10–40% that of the fresh ion-exchange resin.

The weakly-basic anion-exchange resin used in this invention is a compound composed of a base material such as a copolymer of styrene and divinylbenzene, a copolymer of methacrylate and divinylbenzene or a copolymer of phenol and formaldehyde having a primary amine, a secondary amine, or a tertiary amine group as the ion-exchange group. If the weakly-basic anion-exchange resin has at least one kind of the primary amine, secondary amine or tertiary amine group, the resin can be used in this invention regardless of the kind of base resin, the method of synthesis thereof, the polymerization degree, the degree of cross-linking, the structure thereof (getatinous state, porous structure, etc.,) or the fabrication method for the resin.

Typical examples of commercially available weakly-basic anion-exchange resins used in this invention are Diaion WA-10, Diaion WA-11, Diaion WA-20, and Diaion WA-30 (trade names, made by Mitsubishi Chemical Industries Co.), Amberlite IRA-45, Amberlite IRA-93, Amberlite IR-4B, and Amberlite IRP-58 (trade names, made by Orhano Co.) and Dowex-44 (trade name, made by Dow Chemical Co.). The structural formulae of some of these weakly-basic ion-exchange resins are illustrated below, but the weakly-basic anion-exchange resins used in this invention are not to be limited thereto:

Diaion WA-10:

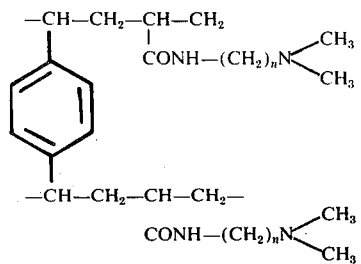

Diaion WA-20:

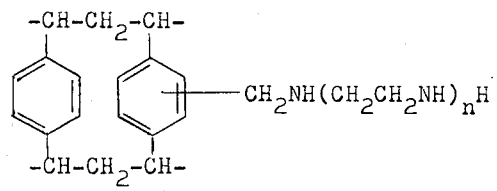

Diaion WA-30:

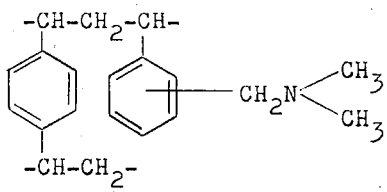

where $n$ is always an integer.

In the case of using the method of this invention, the weakly-basic anion-exchange resins which are most easily regenerated are ones having tertiary amines as the exchange groups. The most excellent ion-exchange resins among the aforesaid weakly-basic anion-exchange resins are Diaion WA-10 and Diaion WA-11, with Diaion WA-10 being particularly preferred, that is to say, Diaion WA10 is the weakly-basic anion-exchange resin having the highest ion-exchange capacity for ferricyanide ions and/or ferrocyanide ions per unit volume of resin and is capable of being most easily regenerated.

Weakly-basic anion-exchange resins are available as the free base type and the salt type but in general they are marketed as the free base type.

In the method of this invention, both the free base type ion-exchange resins and the salt type ion-exchange resins may be used, but in general the free base type ion-exchange resin is used. During the regeneration of a weakly-basic ion-exchange resin used for the ion-exchange of ferricyanide ions and/or ferrocyanide ions, an alkali is ordinarily used. As examples of such alkalis, there are aqueous solutions of an alkali metal hydroxide such as sodium hydroxide and potassium hydroxide or an alkali metal carbonate such as sodium carbonate and potassium carbonate and aqueous ammonia. In the case of using the salt type ion-exchange resin, hydrochloric acid or sodium chloride solution is sometimes used for the regeneration of the ion-exchange resin. The concentration of such a regenerating liquid is about 1–20% by weight, in particular about 3–10%, of the base salt or acid.

The waste liquid processed by the method of this invention fundamentally contains at least a ferricyanide and/or ferrocyanide and ammonium (ions) (and) thiosulfate (ions), but the liquid may contain chemicals other than the above materials.

According to the method of this invention, any waste solutions or liquids containing the aforesaid components can be treated, but a Farmer's reducer containing ammonium thiosulfate as the thiosulfate, instead of sodium thiosulfate, that is to say, waste liquid of a Farmer's reducer containing ammonium thiosulfate in place of sodium thiosulfate, is most profitably treated. This is because a Farmer's reducer containing ammonium thiosulfate in place of sodium thiosulfate has a good reducing action. Furthermore, an additive such as thiocyanate, a chloride or a bromide may be added to such a reducer. Also, a pH-adjusting agent such as acetic acid, sodium acetate, boric acid, a borate, an alkali metal hydroxide or an alkali metal carbonate may be added to the reducer.

A ferricyanide and ammonium ions and thiosulfate ions may be present in the material, e.g., reducer, to be treated by the method of this invention in any concentrations, but the content of the ferricyanide is usually from 0.1 g to 50 g, most preferably 0.5 g to 5 g, per liter of the material, e.g., reducer, to be treated by the method of this invention. The content of ammonium ions and thiosulfate ions, expressed as ammonium thiosulfate, is usually from 1 g to 400 g, most preferably from 10 g to 100 g per liter of material, e.g., reducer, to be treated.

When sodium ammonium thiosulfate or a combination of sodium thiosulfate and an ammonium compound is used in place of ammonium thiosulfate, they are used in an amount equivalent to the amount of ammonium thiosulfate mentioned above.

The reducere used in this invention can be prepared directly from a ferricyanide and ammonium thiosulfate or may be prepared by separately forming a solution containing the ferricyanide and a solution containing ammonium thiosulfate and by mixing the two solutions before use. Also, in the case of preparing two solutions, solutions having any concentration may be prepared, and at use they may be mixed and diluted to the desired concentration.

For subjecting a printing plate prepared by imagewise exposing a photographic material and then developing the material to a reducing treatment, the printing plate may be brought into contact with the above-mentioned reducer after wetting the plate with water. The photographic material may be treated with a reducer containing a ferricyanide and ammonium thiosulfate or with a solution containing a ferricyanide and a solution containing ammonium thiosulfate separately. In the latter case, the material may be treated first with a solution containing a ferricyanide and then with a solution containing ammonium thiosulfate or it may be treated first with a solution containing ammonium thiosulfate and then with a solution containing a ferricyanide. In any case, the treatment(s) can be repeated.

As a result of conducting the reducer treatment as stated above, the waste material of the reducer is discharged. The waste liquid from the reducer usually contains thiosulfate ions, ammonium ions, silver ions, ferricyanide ions, ferrocyanide ions, etc. Waste liquid cntaining any concentration of ferricyanide ions and/or ferrocyanide ions can be treated by the method of this invention. However, the concentration of the ferricyanide ions and ferrocyanide ions in the waste liquid is usually less than 5,000 ppm, more generally less than 1,000 ppm.

The waste liquid or water containing the ferricyanide ions and/or the ferrocyanide ions can be brought into contact with the weakly-basic ion-exchange resin in any manner. In general, the ion-exchange resin is filled in a cylindrical vessel to form a resin layer and the waste liquid is passed downwardly through the layer. In such a manner, the ferricyanide ions and/or the ferrocyanide ions can be continuously removed from the waste liquid. If desired, the treatment may be conducted in a batch system, i.e., the ion-exchange resin is added to the waste liquid stored in a tank followed by stirring and then the ion-exchange resin is precipitated or filtered off. However, the merits of this invention become remarkable when the waste liquid is treated in a continuous system as mentioned before, and thus the use of the ion-exchange resin layer is generally preferred.

For overall process efficiency, ferricyanide and/or ferrocyanide is usually adsorbed in an amount of not more than 100 g (preferably not less than 50 g) per 1 liter of the resin.

The weakly-basic anion-exchange resin thus used for ion-exchange of the ferricyanide and/or the ferrocyanide is regenerated by contactng it with an aqueous alkali solution. As the aqueous alkali solution, there can be used an aqueous solution of alkali metal hydroxide such as sodium hydroxide and potassium hydroxide, or an alkali metal carbonate such as sodium carbonate and potassium carbonate, or aqueous ammonia. The concentration of alkali in the aqueous alkali solution used for the regeneration is usually about 1–20% by weight, preferably 2–10% by weight.

The aqueous alkali solution can be brought into contact with the ion-exchange resin to be regenerated in any manner. For instance, in the same manner used for contacting the waste liquid from the photographic processing with the ion-excahnge resin as mentioned above. By the regeneration, the ferricyanide ions and/or the ferrocyanide ions are removed from the ion-exchange resin and a waste solution containing the ferrocyanide ions and/or the ferrocyanide ions is discharged. The waste solution from the regeneration of the ion-exchange resin contains a large quantity of ferricyanide ions and/or the ferrocyanide, ions, e.g., as high a concentration as 10,000 – 100,000 ppm. Thus, the waste solution from the regeneration contains a highly concentrated amount of the ferricyanide ions and/or ferrocyanide ions but it does not contain too many other inorganic anions other than hydroxide ions. The ferricyanide ions and/or the ferrocyanide ions can then be removed from the waste solution readily by a thermal decomposition treatment or by a precipitation treatment with iron salts, etc.

The method of this invention has the following excellent points:

1. The method of this invention does not require large and expensive treatment as in electrodialysis or in reverse osmosis, and thus the method does not require a large space and equipment cost is low.

2. The electrodialysis method, reverse osmosis method, combustion method and thermal decomposition method require a large amount of energy (such as heavy oil) and have a high cost of operation, while the ion-exchange method of this invention does not require such an energy source and the operation cost is low.

3. The operation is quite simple and can be performed without great skill or a large number of personnel.

4. The ion-exchange resin can be regenerated and reused repeatedly, which makes the method of this invention very economical.

Since the waste solution discharged from the regeneration step contains a high concentration of ferricyanide ions and/or ferrocyanide ions, the ferricyanide or ferrocyanide can be easily recovered therefrom or the waste solution can be again used as a reducer.

The method of this invention can be applied to any waste liquids from a reducing treatment of any lithographic or graphic art material.

Exemplary of silver halide photographic materials used as plates for printing are lithographic photographic materials for making dot images or line images, photographic materials having high contrast and collodion wet plates.

Furthermore, the method of this invention can be applied to waste liquids from a reducer treatment for any other photographic materials for printing.

The invention will now be illustrated in greater detail by several examples:

EXAMPLE 1

Two cylinders each having an inside diameter of 4.5 cm were prepared. In one of the cylinders was packed 300 ml of a weakly-basic anion-exchange resin (Diaion WA-10) and in the other cylinder was packed 300 ml of a strongly-basic anion-exchange resin (Diaion SA-10 A). A solution prepared by diluting the Farmer's reducer having the following composition with water to 20 times the original volume was passed through the cylinders packed with the ion-exchange resins at a rate of 300 ml/min and the amount of the solution passed through the cylinders when ferricyanide ions or ferrocyanide ions appeared in the solution withdrawn (treating capacity) was measured.

Farmer's reducer composition:
Solution A: 500 ml of water containing 37.5 g of ferricyanide.
Solution B: 2 liters of water containing 480 g of crystalline sodium thiosulfate.

At use, 30 ml of Solution A was mixed with 120 ml of Solution B, and then the mixture was diluted with water to 1 liter.

The detection of ferricyanide ions or ferrocyanide ions was conducted by adding to the solution a diluted acid solution of 3% by weight ferrous sulfate and subjecting the solution to visible spectral photometry.

When the ferricyanide and/or ferrocyanide were detected, the ion-exchange resin was withdrawn from the cylinder, placed in a beaker containing 500 ml of an aqueous solution of 4% by weight sodium hydroxide, and the mixture was allowed to stand for 30 minutes while stirring the mixture to conduct the regeneration of the ion-exchange resin.

The ion-exchange resin was then washed with water, repacked in the cylinder having an inside diameter of 4.5 cm, and then the solution prepared by diluting the above-mentioned Farmer's reducing with water to 20 times the original volume was further passed through the cylinder at a rate of 300 ml/min. as above.

The results of measurements of the amounts of the treated solution passed when ferricyanide ions or ferrocyanide ions were detected (treatment capacity) are shown in the folloiwng table.

| No. | Ion-exchange resin | Treatment capacity | |
|---|---|---|---|
| | | fresh resin | regenerated resin |
| 1 | Weakly-basic anion-exchange resin (Diaion WA-10) | 1 liter | 1 liter |
| 2 | Strongly-basic anion-exchange resin (Diaion SA-10A) | 30 liters | 8 liters |

As shown in the above table, the treatment capacity of the weakly-basic anion-exchange resin was low but a difference in treatment capacity between the fresh resin and the regenerated resin was not observed. The treatment capacity of the strong-basic anion-exchange resin was high, but the treatment capacity of the resin after regeneration was proportionately greatly reduced.

Then, two cylinders each having an inside diameter of 4.5 cm were also prepared and 300 ml of a weakly-basic anion-exchange resin (Diaion WA-10) was packed in one the cylinders while 300 ml of a strongly-basic anion-exchange resin (Diaion SA-10A) was packed in the other cylinder. A solution prepared by diluting the reducer having the following composition with water to 20 times the original volume was passed through each of the ion-exchange resin columns at a rate of 300 ml/min. The amount of the solution passed through the column until ferricyanide ions or ferrocyanide ions were observed in the solution from the column (treatment capacity) was measured.

Reducer composition:
Solution A: 500 ml of water containing 37.5 g of ferricyanide.
Solution B: 2 liters of water containing 410 ml of ammonium thiosulfate (70% aqueous solution).

At use, 30 ml of Solution A was mixed with 120 ml of Solution B, and then the mixture was diluted with water to 1 liter.

Then, the ion-exchange resins were regenerated in the same manner as described above. Thereafter, the solution prepared by diluting the reducer with water to 20 times the original volume was passed through each of the regenerated ion-exchange resins, and the amount of the solution passed therethrough until ferricyanide ions or ferrocyanide ions were observed in the solution (treatment capacity) was measured, the results of which are shown in the following table.

| No. | Ion-exchange resin | Treatment capacity | |
|---|---|---|---|
| | | Fresh resin | regenerated resin |
| 3 | Weakly-basic anion-exchange resin (Diaion WA-10) | 220 liters | 210 liters |
| 4 | Strongly-basic anion-exchange resin (Diaion SA-10A) | 50 liters | 15 liters |

As shown in the above table, when the solution prepared by diluting the reducer containing ammonium thiosulfate according to the present invention with water was treated by the weakly-basic anion-exchange resin, the treatment capacity of both the fresh resin and the regenerated resin was great, and there was substantially no difference in treatment capacity between the fresh resin and the regenerated resin. On the other hand, when the solution prepared by diluting the reducer containing ammonium thiosulfate with water was treated by the strongly-basic anion-exchange resin, which is an ion-exchange resin outside the scope of this invention, the treating capacities of the fresh resin and the regenerated resin were quite low as compared with those of the weakly-basic anion-exchange resin in this invention, and although the treatment capacities of the strongly-basic anion-exchange resin while fresh and regenerated did increase to some extent, the treatment capacity of the regenerated strongly-basic anion exchange resin was very low.

EXAMPLE 2

In a cylinder having an inside diameter of 14 cm was packed 4 liters of a weakly-basic anion-exchange resin (Diaion WA-10) and a waste solution of a reducer was passed through the resin-packed cylinder at a rate of 5 liters/min. The waste solution used above was derived as follows, photographic printing plates previously well wetted were immersed in a reducer having the following composition:

Reducer composition:

| Solution A: | Water | 200 ml |
| | Ammonium thiosulfate (70% aqueous solution) | 30 ml |
| Solution B: | Water | 100 ml |
| | Ferricyanide | 10 g. |

Directly before use, 5 parts of Solution A, 100 parts of the Solution B and 100 parts of water were mixed.

After conducting the reducer treatment, the printing plates were washed with water to provide the waste solution. Local fog in the printing plates were subjected to reducer treatment by weakly rubbing the portions with absorbent cotton impregnated with the reducer, and then the portions were washed with water to also provide waste solution. Both waste solutions were used in the above procedure as the treated waste solution. The total concentration of ferricyanide ions and ferrocyanide ions in the waste solution of the reducer was in the range of 0–200 ppm., but the mean concentration was 50 ppm.

Waste solution was passed through the above-described cylinder containing the ion-exchange resin and then the amount of the solution passed through the cylinder until ferricyanide ions or ferrocyanide ions were detected in the solution was measured (treatment capacity).

The ion-exchange resin thus used for the treatment of the waste solution of reducer to remove ferricyanide ions and ferrocyanide ions by ion-exchange was washed with water and regenerated by passing therethrough 10 liters of an aqueous solution of 4% by weight sodium hydroxide at a rate of 500 ml/min.

Then, after washing the ion-exchange resin with water, the waste solution of the reducer described above was passed through the ion-exchange resin thus regenerated and the amount of solution passed through the resin when ferricyanide ions or ferrocyanide ions were detected in the solution was measured (treatment capacity). The results are shown in the following table.

| Treatment capacity | |
|---|---|
| Fresh resin | Regenerated resin |
| 11 tons | 10 tons |

As shown in the above table, the weakly-basic anion-exchange resin showed a high capacity for removing ferricyanide ions and/or ferrocyanide ions in the waste solution when fresh as well as when regenerated.

The amount of solution discharged from the cylinder packed with the ion-exchange resin during regenerating the ion-exchange resin with aqueous 4% sodium hydroxide solution was 16 liters. The total concentration of ferricyanide and ferrocyanide ions in the waste solution from the regeneration was about 30,000 ppm. From this result, it can be understood that the ferricyanide ions and the ferrocyanide ions were concentrated about 600 times by the method of this invention.

EXAMPLE 3

In a cylinder having an inside diameter of 4.5 cm was packed 300 ml of a weakly-basic anion-exchange resin (Diaion WA-11). Then, the solution prepared by diluting with water to 30 times the original volume the reducer having the following composition was passed through the cylinder containing the ion-exchange resin:

Reducer composition:

| Solution A: | Ferricyanide | 300 g |
| | Water | 700 ml |
| Solution B: | Ammonium thiosulfate | 600 g |
| | Water | 900 ml |

At use, 1 part of Solution A, 10 parts of Solution B and 10 parts of water were mixed.

The amount of solution passed through the cylinder when ferricyanide ions or ferrocyanide ions were detected in the solution was measured (treatment capacity).

Thereafter, the ion-exchange resin was regenerated as in Example 1 and the solution prepared by diluting 30 times the above-mentioned reducer was passed through the regenerated ion-exchange resin, the results being shown in the following table.

| Treatment capacity | |
|---|---|
| Fresh resin | Regenerated resin |
| 42 liters | 40 liters |

While the invention has been described in detail and with reference to specific embodiments thereof, it will be apparent to one skilled in the art that various changes and modifications can be made therein without departing from the spirit and scope thereof.

What is cclaimed is:

1. A method of treating a waste liquid from a reducer used for the reducing treatment of photographic printing materials containing ferricyanide ions and/or ferrocyanide ions from photographic processings which comprises contacting the waste liquid with a weakly-basic anion-exchange resin in the presence of ammonium ions and thiosulfate ions.

2. The method as set forth in claim 1 wherein the weakly-basic anion-exchange resin used for the treatment of the waste liquid for removing therefrom ferricyanide ions and/or ferrocyanide ions is regenerated for reuse.

3. The method as set forth in claim 2 where regeneration is with an aqueous alkali solution.

4. The method as set forth in claim 3 where the aqueous alkali solution comprises 1–20 wt.% alkali, based on solution weight.

5. The method as set forth in claim 1 where the amount of ferricyanide in the waste liquid is from 0.1 to 50 g per liter of the waste liquid, and the amount of ammonium ions and thiosulfate ions, expressed as ammonium thiosulfate, is 1 to 400 g per liter of the waste liquid.

6. The method as set forth in claim 5 where the ammonium ions and thiosulfate ions are derived from ammonium thiosulfate present in the waste liquid.

7. The method as set forth in claim 1 where the weakly-basic anion-exchange resin comprises at least one of primary, secondary or tertiary amine groups as the active exchange groups.

8. The method as set forth in claim 7 where the groups are on a base material selected from the group consisting of: a copolymer of styrene and divinylbenzene; a copolymer of methacrylate and divinylbenzene; and a copolymer of phenol and formaldehyde.

9. The method as set forth in claim 1, wherein said waste liquid is a Farmer's reducer.

10. A method of removing ferricyanide ions and/or ferrocyanide ions from a waste solution discharged after subjecting photographic printing plates to a reducing treatment using a reducer containing ferricyanide and a thiosulfate by contacting the waste solution with an ion-exchange resin which comprises using ammonium thiosulfate as the thiosulfate and using a weakly-basic anion-exchange resin as the ion-exchange resin.

11. The method as set forth in claim 10 wherein said ion-exchange resin used for the removal of ferricyanide ions and/or ferrocyanide ions from the waste solution is regenerated for reuse.

12. The method as set forth in claim 11 where regeneration is with an aqueous alkali solution.

13. The method as set forth in claim 12 where the aqueous alkali solution comprises 1–20 wt.% alkali, based on solution weight.

14. The method as set forth in claim 10 where the amount of ferricyanide in the waste solution is 0.1 to 50 g per liter of the waste solution, and the amount of ammonium thiosulfate is from 1 to 400 g per liter of the waste solution.

15. The method as set forth in claim 10 where the weakly-basic anion-exchange resin comprises at least one of primary, secondary or tertiary amine groups as the active exchange groups.

16. The method as set forth in claim 15 where the groups are on a base material selected from the group consisting of: a copolymer of styrene and divinylbenzene; a copolymer of methacrylate and divinylbenzene; and a copolymer of phenol and formaldehyde.

17. The method as set forth in claim 10, wherein said waste solution is a Farmer's reducer.

* * * * *